US012643702B2

(12) United States Patent
Wennberg et al.

(10) Patent No.: US 12,643,702 B2
(45) Date of Patent: Jun. 2, 2026

(54) SEALING ELEMENT FOR SEALING A PACKAGE AND DEVICE FOR SEALING A PACKAGE

(71) Applicant: Ecolean AB, Helsingborg (SE)

(72) Inventors: Ulf Wennberg, Lund (SE); Per Abrahamsson, Raa (SE); Ulf Nordlof, Kivik (SE); Pontus Sundstrom, Helsingborg (SE)

(73) Assignee: Ecolean AB, Helsingborg (SE)

( * ) Notice: Subject to any disclaimer, the term of this patent is extended or adjusted under 35 U.S.C. 154(b) by 146 days.

(21) Appl. No.: 17/758,340

(22) PCT Filed: Dec. 14, 2020

(86) PCT No.: PCT/EP2020/085884
§ 371 (c)(1),
(2) Date: Jul. 1, 2022

(87) PCT Pub. No.: WO2021/139962
PCT Pub. Date: Jul. 15, 2021

(65) Prior Publication Data
US 2023/0040786 A1 Feb. 9, 2023

(30) Foreign Application Priority Data

Jan. 8, 2020 (EP) .................................... 20150717

(51) Int. Cl.
B65B 59/04 (2006.01)
B29C 65/00 (2006.01)
(Continued)

(52) U.S. Cl.
CPC .............. B65B 59/04 (2013.01); B29C 65/32 (2013.01); B29C 66/3452 (2013.01);
(Continued)

(58) Field of Classification Search
CPC ....... B65B 59/04; B65B 51/146; B29C 65/32; B29C 66/3452; B29C 66/43121;
(Continued)

(56) References Cited

U.S. PATENT DOCUMENTS 2,987,107 A * 6/1961 Sylvester .............. B29C 66/849
156/515
4,097,327 A * 6/1978 Calemard ........... B29C 66/8432
156/580.2
(Continued)

FOREIGN PATENT DOCUMENTS

EP 370798 A * 5/1990 ............. B29C 65/18
EP 1 101 856 A2 5/2001
(Continued)

OTHER PUBLICATIONS

International Search Report issued Mar. 12, 2021 in PCT/EP2020/085884 filed Dec. 14, 2020, citing documents AA-AB and AO-AP therein, 3 pages.
(Continued)

*Primary Examiner* — Sameh Tawfik
(74) *Attorney, Agent, or Firm* — Oblon, McClelland, Maier & Neustadt, L.L.P.

(57) ABSTRACT
A sealing element for sealing a package, the sealing element configured to cooperate with an abutment for engaging the package for providing a seal to the package and a device for sealing a package. The sealing element includes a sealing element, an abutment and a base, the sealing element is releasably supported by the base, and at least one of the base and the abutment is moveably arranged for engagement with the package from opposing sides for providing a seal to the package.

4 Claims, 6 Drawing Sheets

(51) Int. Cl.
  *B29C 65/32*        (2006.01)
  *B65B 51/14*        (2006.01)
  *B29L 31/00*        (2006.01)

(52) U.S. Cl.
  CPC .. *B29C 66/43121* (2013.01); *B29C 66/73921* (2013.01); *B29C 66/8122* (2013.01); *B29C 66/81261* (2013.01); *B29C 66/81417* (2013.01); *B29C 66/8167* (2013.01); *B29C 66/83221* (2013.01); *B29C 66/849* (2013.01); *B65B 51/146* (2013.01); *B29C 66/72341* (2013.01); *B29L 2031/7128* (2013.01)

(58) Field of Classification Search
  CPC .......... B29C 66/73921; B29C 66/8122; B29C 66/81261; B29C 66/81417; B29C 66/8167; B29C 66/83221; B29C 66/849; B29C 66/72341; B29L 2031/7128
  USPC ....................................................... 53/373.7
  See application file for complete search history.

(56)            References Cited

U.S. PATENT DOCUMENTS

| | | | | |
|---|---|---|---|---|
| 4,496,407 | A * | 1/1985 | Lowery, Sr. ...... | B29C 66/84121 156/251 |
| 4,534,819 | A * | 8/1985 | Payet ................... | B29C 66/729 156/580.2 |
| 4,542,771 | A * | 9/1985 | Payet ...................... | B29C 66/43 139/291 C |
| 4,693,771 | A * | 9/1987 | Payet ...................... | B29C 66/43 156/580.2 |
| 4,715,166 | A * | 12/1987 | Kameda ................ | B29C 65/305 53/550 |
| 6,167,681 | B1 * | 1/2001 | Yano ................. | B29C 66/81264 53/374.6 |
| 6,637,490 | B1 * | 10/2003 | Azulay ................... | D06H 7/223 156/580.2 |
| 2019/0039325 | A1 * | 2/2019 | Takidis ............... | B29C 66/4324 |

FOREIGN PATENT DOCUMENTS

| | | | |
|---|---|---|---|
| JP | 57-156405 | A | 9/1982 |
| JP | 59-175491 | A | 10/1984 |
| JP | 2009-22977 | A | 2/2009 |
| JP | 2009-149365 | A | 7/2009 |
| JP | 2010-228779 | A | 10/2010 |
| JP | 2014-213859 | A | 11/2014 |
| JP | 2017-13465 | A | 1/2017 |
| JP | 2019-131215 | A | 8/2019 |
| RU | 2 243 136 | C2 | 12/2004 |

OTHER PUBLICATIONS

Office Action issued Feb. 6, 2024, in corresponding Japanese Patent Application No. 2022-539157 (English Translation only), 3 pages.
Russian Decision of Grant issued Feb. 22, 2023 in Russian Application 2022118591, (with English translation), citing document 15 therein, 2 pages.
Japanese Office Action issued Jul. 25, 2023 in Japanese Application 2022-539157, (submitting English translation only), citing documents 15-21 therein, 6 pages.
Indian Office Action issued Aug. 7, 2023 in Indian Application 202227034328, citing document 15 therein, 8 pages.
Office Action issued Oct. 17, 2023, in corresponding Brazilian Patent Application No. BR112022013460-6, 4 pages.
Office Action issued Oct. 17, 2023, in corresponding Canadian Patent Application No. 3,163,965, 3 pages.
Korean Office Action issued in Korean Patent Application No. 10-2022-7026937 on May 12, 2025.
Brazil Office Action issued in Brazil Patent Application No. 11 2022 013460 6 on May 18, 2025.
Chinese Office Action issued in Chinese Patent Application No. 202080090419.4 on Mar. 27, 2025.

* cited by examiner 304 304

302

300

200

202
204
204
206

SEALING ELEMENT FOR SEALING A PACKAGE AND DEVICE FOR SEALING A PACKAGE

FIELD OF THE INVENTION

The present invention relates to production of packages, more specifically to sealing of packages. It relates to a sealing element for producing a seal in a package and to a device for sealing packages comprising such a sealing element.

BACKGROUND ART

A package of collapsible type, such as a package of stand-up pouch type, typically comprises a filling chamber in which a product, such as a liquid, may be contained. During a filling procedure of the package, the product may be supplied by inserting a nozzle in a filling channel of the package. Subsequently, the package has to be sealed so that the product cannot escape from the filling chamber. By way of example, the sealing may be performed by means of welding, whereby the package is placed between engagement surfaces of a pair of jaws, or between a jaw and an abutment, which are arranged to engage with each other and thereby exert pressure on a portion of the package for providing a seal. At least one of the jaws may be heated and the other jaw or abutment may be non-heated.

Each jaw can further be provided with a coating to avoid that material from the package sticks to the jaws during the sealing process.

Each jaw is however subjected to wear, not only in that the coating becomes worn off but also in that the jaw itself may become deformed after a certain number of packages have been processed. If the sealing is performed by means of heat, the material from the package may also stick to heated jaw, the probability of which increases when the coating has become worn.

When heating the jaw, the temperature which is is heated to affects the durability of the jaw, with a higher temperature resulting in a decrease in the number of packages that can be sealed before the jaw needs to be replaced.

Naturally, there is a cost associated with each jaw replacement, not only in the cost of the jaw itself but also in the downtime necessary for the process equipment. It is thus desired to be able to increase the number of packages that can be produced before the jaw needs to be replaced.

US2019/039325 A1 discloses a strapping device designed as an ultrasonic welding device. The device comprises a sonotrode with two contact surface which each is aligned at an angle deviating from a right angle relative to the provided vibration direction of the sonotrode.

JP2017013465 A discloses an ultrasonic wave seal device comprising a tool horn configured to convert ultrasonic wave vibration in the longitudinal direction into vibration in a horizontal direction.

EP1101856 A2 discloses an anvil assembly adapted for selective cooperation with a horn coupled to an ultrasonic wave generator. The anvil assembly comprises an anvil and a cradle, the anvil being adapted to be selectively mounted onto the cradle in any of at least two mounting positions.

SUMMARY OF THE INVENTION

In view of that stated above, the object of the present invention is to provide a sealing element for sealing a package that improves on prior art solutions. It is also an object of the present invention to provide device for sealing a package comprising said sealing element that mitigates some of the problems of prior art solutions.

To achieve at least one of the above objects and also other objects that will be evident from the following description, a sealing element having the features defined in claim 1 is provided according to the present invention. Preferred embodiments of the device will be evident from the dependent claims.

More specifically, there is provided according to the present invention a sealing element for sealing a package, the sealing element being configured for cooperation with an abutment for engaging the package for providing a seal to the package. The sealing element comprises a body having a first side edge provided with a top and a bottom side edge surface, each of the top and bottom side edge surface being disposed at an acute angle to an extension plane of the body such that the top and bottom side edge surfaces are mirrored about the extension plane and face away from each other. The body of the sealing element is made of a metallic material having a thermal conductivity above 100 W/mK.

The sealing element is thus provided with several side edge surfaces, extending the effective operation time of the sealing element. When one of the top or bottom side edge surface has become worn out, the sealing element can simply be reoriented such that a new, unused one of the top and bottom side edge surface can be used instead. The sealing element does therefore less frequently need to be discarded, which is not only of benefit to the production process but also environmentally as each sealing element can be used more efficiently. The metallic material of which the body of the sealing element is made may be brass, copper, steel etc. Having a metallic material with a thermal conductivity above 100 W/mK ensures that a sufficient amount of heat is conducted through the body of the sealing element and transferred to the side edge surfaces such that a satisfactory seal can be achieved.

The sealing element may further comprise a second side edge opposing the first side edge, which is provided with a corresponding top and bottom side edge surface which extends the use of the sealing element even further.

The sealing element may in one embodiment comprise a third and fourth side edge which are opposite each other and adjoining the first side edge. Each of the third and fourth side edge is provided with a corresponding top and bottom side edge surface.

The body may further be provided with a coating covering at least the top and bottom side edge surfaces and improving the wear resistance and the non-stick characteristics of the sealing element. The coating may have a thickness in the range of 25-55 μm.

In a non-limiting example, the body of the sealing element may be made of brass and may be provided with a coating commercially available under the trademark Impreglon TC10S45. The coating may be applied with a thickness of 40 μm (+/−10 μm).

As mentioned above, the coating may improve the wear resistance of the sealing element and reduce the risk of material from the package sticking to the sealing element during the sealing of the package.

The sealing element may further still comprise mounting means for mounting of the sealing element to a sealing device.

In one embodiment, each side edge is provided with a groove separating the top and bottom side edge surface. The separation of the top and bottom side edge surface reduces the risk of that a damage which occurs to one of the side edge surfaces also affects the other. The sealing element is thus made more robust.

In a second aspect, a device for sealing a package is provided. The sealing device comprising a sealing element according to the first aspect, an abutment and a base. The sealing element is releasably supported by the base and at least one of the base and the abutment is moveably arranged for enabling engagement of the base and the abutment with the package from opposing sides for providing a seal to the package. The sealing element is attachable to the base such that the top or the bottom side edge surface on each side edge is selectively arranged facing the abutment.

A more efficient sealing device is thus achieved, where the downtime is reduced as the sealing element can be reoriented instead of replaced each time when a side edge surface is worn. The time between replacement of the sealing element is extended.

Additionally, the abutment may comprise a resilient abutment surface. The resilient abutment surface spreads the pressure between the sealing element and the abutment which facilitates that all portions of the package that are intended to be sealed actually gets sealed. The resilient abutments surface consequently reduces the risk of leaks in the seal.

The sealing device may further still comprise a thermal element configured to heat at least the sealing element.

The thermal element may be configured for constant heating of the sealing element, which reduces the risk of insufficient heat in the sealing element during the seal which could be a risk when using intermittent heating.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
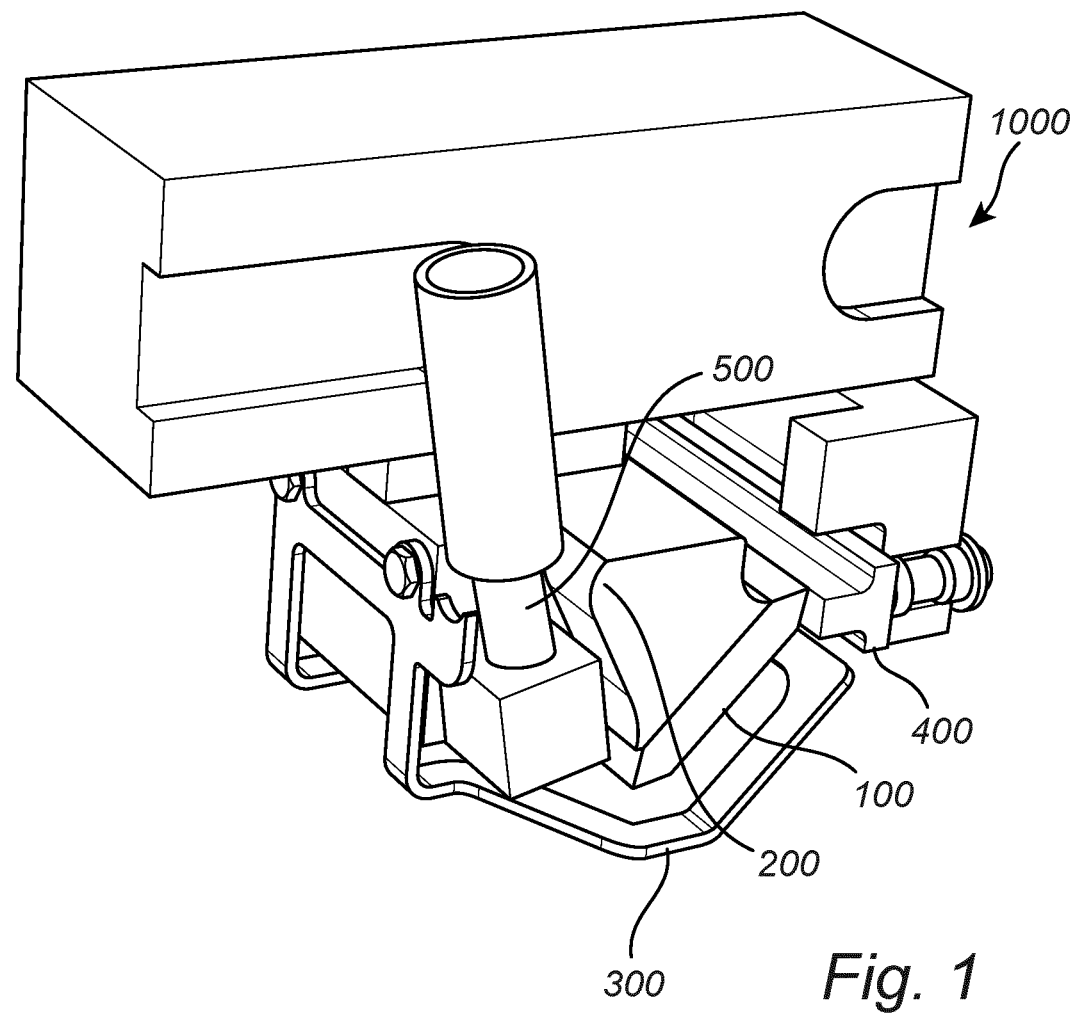
FIG. 1 discloses a perspective view of a sealing device according to one embodiment.

FIG. 1 shows a detail view of a device 1000 for sealing a package (not shown). The device 1000 may form part of a production line in which several devices 1000 are arranged parallelly and/or one after the other. In the latter case, each device 1000 may be configured to only provide a partial seal to the package.

The device 1000 for sealing a package, as mentioned, may form part of a production line for handling flexible packages 600. The packages 600 may be provided from material webs wound up on rolls according to methods well-known to a person skilled in the art. The rolls are arranged to be unwound and fed to the production line. Initially, the packages 600 may be fed edgewise and subsequently the packages may be fed intermittently broadwise.

The packaging material of the package 600 may comprise at least one layer comprising a plastic material, for example polymers, such as polyolefin. The layer may also comprise a filler such as a mineral material.

In a first non-limiting example, the packaging material comprises a layer comprising plastic material and a chalk material. In a second non-limiting example, the packaging material is solely comprised out of a plastic material. In particular, the packaging material may comprise a recyclable material. The packaging material may comprise a filler and a binder.

The packaging material may also comprise additional layers, such as outer sealing layer, gas barrier layer or light barrier layer.

It is appreciated that the packaging material may comprise other materials and that the choice of materials is not limited to the examples presented above. However, the packaging material comprises surface sections made of a material which is arranged to melt above a certain melting temperature such that the flexible package may be formed in a sealing operation.

The package 600 may be filled with a product, such as a product in liquid form or in powder form. The product may be a liquid food product such as dairy products, such as milk, water, juice, wine, lemonade, a beverage, etc. It is understood that other similar products suitable for be contained in the flexible package may be used.

The production line may comprise a filling unit for filling the package 600 with the product and at least one sealing device 1000. Naturally, the production line may comprise other stations as well such as a gas-filling station and transport units such as vacuum holders etc, as would be realized by a person skilled in the art. The overall design of the production line is not of significant importance to the teachings herein and it will thus not be described or exemplified further in the present disclosure.

The sealing device 1000 comprises a sealing element 100. The sealing element 100 is configured for cooperation with an abutment 400 to form a seal in a package arranged between the sealing element 100 and the abutment 400.

The abutment may be a passive element against which the sealing element is pressed for forming the seal as illustrated in the shown example. However, the abutment may alternatively be an active element and may thus comprise an additional sealing element such that the package is engaged by two sealing elements from opposing sides for forming the seal.

The sealing element 100 is releasably supported by a base 200. To generate the seal in the package, at least one of the base 200, which supports the sealing element 100, and the abutment 400 is moveably arranged for enabling engagement of the base and the abutment with the package from opposing sides. The movement of the base 200 and/or the abutment 400 may be achieved in a number of ways as is realized by a person skilled in the art. For instance, the movement may be controlled pneumatically, hydraulically or by means of electric motors/actuators.

The sealing device 1000 may further be configured to provide a seal that covers only a part of the width of the package 600, as mentioned above. The process is then repeated with the package 600 moved until the entire package is sealed. Such a process could also comprise providing the seals to the package 600 with an overlap such that at least portions of the seal is processed multiple times. This could be achieved using one sealing device 1000 or by means of several sealing devices 1000 arranged after each other in the production line. Alternatively, the sealing device 1000 could be arranged to seal the entire package 600 in one sealing step.

As can be further seen in FIG. 1, the device 1000 may comprise a shielding element 300. The shielding element 300 is attachable to the base 200 and/or to the sealing element 100. The shielding element 300 extends below the sealing element 100 towards the abutment 400 such that it prevents the package 600 from coming into contact with the sealing element 100 in other places than where the seal is to be formed. This is desirable in some embodiments as the sealing element 100 may be heated, which could cause damage to the package 600 if it were to come into contact with it in other places than where the seal is to be created. The shielding element 300 may be embodied in a number of ways as will be further described in relation to FIGS. 3, 7 and 11.

Further still, the device 1000 may comprise a thermal element 500. The thermal element 500 is configured to heat the sealing element 100, directly or via heating of the base 200, whereby the sealing element 100 can provide a seal to the package 600 by means of heat welding. The thermal element 500 may be configured to heat the sealing element 100 or the base 200 in a number of ways as is realized by the person skilled in the art. It may e.g. heat the sealing element 100 or the base 200 conductively or by induction. In an embodiment where the thermal element 500 connects to the base 200, the sealing element 100 is heated conductively by the heat from the base 200.

The thermal element 500 may be configured to heat the sealing element 100 intermittently or, as is preferred, constantly when the production process is active.

The sealing element 100 is attachable to the base 200 such that a top or a bottom side edge surface 104 on each side edge 110, 112, 114, 116 is selectively arranged facing the abutment 400. Preferably, the top or bottom side edge surface 104 which faces the abutment is arranged essentially vertically. The terms "top" and "bottom" are herein used only for illustrative purposes to explain the disclosed embodiments, the top side edge surface 104 may just as well be arranged below the bottom side edge surface 104 in practice.

Figure 2:
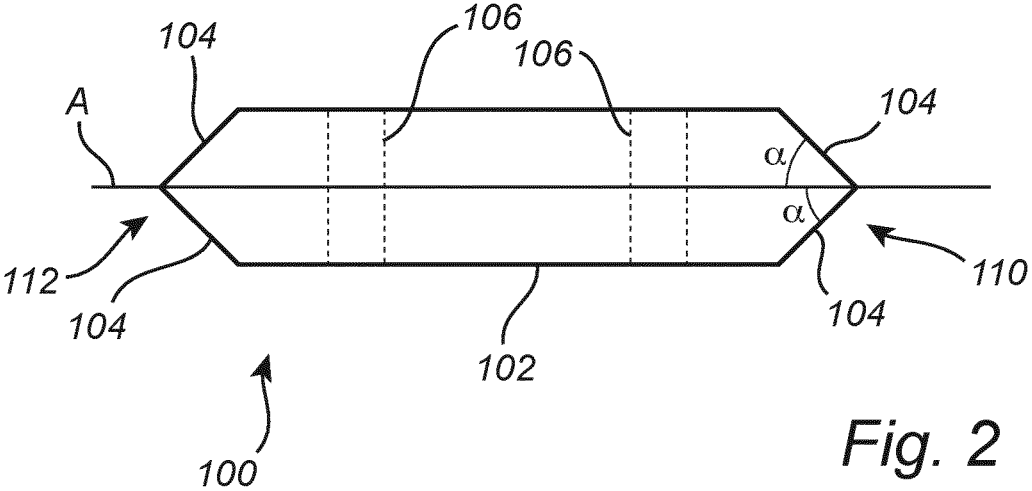
FIG. 2 discloses a side view of a sealing element according to one embodiment.

Turning now to FIG. 2 in which one embodiment of the sealing element 100 is shown in a side view. The sealing element comprises a body 102, the body 102 forms the structural main portion of the sealing element 100. The sealing element body 102 may be formed by a metallic material, such as steel, aluminium, brass, copper etc. As the sealing element 100 in one embodiment is configured to be heated, the material of the body 102 may have a thermal conductivity being at least 100 W/mK. The thermally conductive material of the body 102 of the sealing element 100 allows heat, that may be provided from the thermal element 500, to effectively spread throughout the body 102 such that each top and bottom edge surface 104 are sufficiently heated.

The sealing element 100 may further be coated, at least at the top and bottom side edge surfaces 104 thereof, with a coating that improves wear resistance and non-stick characteristics, i.e. prevents material from the package 600 to stick to the sealing element 100. The coating may have a thickness in the range of 25-55 μm.

The sealing element 100 shown in FIG. 2 comprises a first side edge 110 and a second side edge 112 opposite the first side edge 110. On each side edge 110, 112 is a top and a bottom side edge surface 104 arranged. The embodiment shown in FIG. 2 comprises two side edges 110, 112 provided with a top and bottom side edge surface, however the sealing element 100 may in other embodiments comprise fewer or more side edges 110, 112, 114, 116 of this type.

As can be seen, both the top and the bottom side edge surface 104 is disposed at an acute angle α to an extension plane A of the body 102 such that the top and bottom side edge surfaces 104 are mirrored about the extension plane A and face away from each other. The sealing element 100 can thus be attached to the base 200 such that each side edge surface 104 faces the abutment 400, extending the life time of the sealing element 100. The sealing element 100 is rotated/reoriented on the base 200 once one side edge surface 104 is worn, extending the use of each sealing element 100 before all side edge surfaces 104 are expended. The angle α may be in the range of 40°-50°, preferably approximately 45°.

The sealing element 100 in the embodiment shown in FIG. 2 comprises mounting means 106 which are used to attach the sealing element 100 to the base 200. Each mounting means 106 may be an hole, optionally threaded, into which a fastener such as a screw may be received for attachment to the base 200. Other ways of attaching the sealing element 100 to the base 200 are also considered such as by means of clips or other types of quick connectors.

As already mentioned, the sealing element 100 may be heated in order to provide the seal to the package, the heated sealing element 100 at least partially melts the material in the package such that bonding occurs to form the seal. The amount of heat in the sealing element 100 may be varied by the sealing device 1000 which affects the contact time necessary with the package 600 to create a satisfactory seal. Reducing contact time is beneficial as it increases the amount of sealed packages that can be produced by each jaw in the machine.

Figures 3, 4:
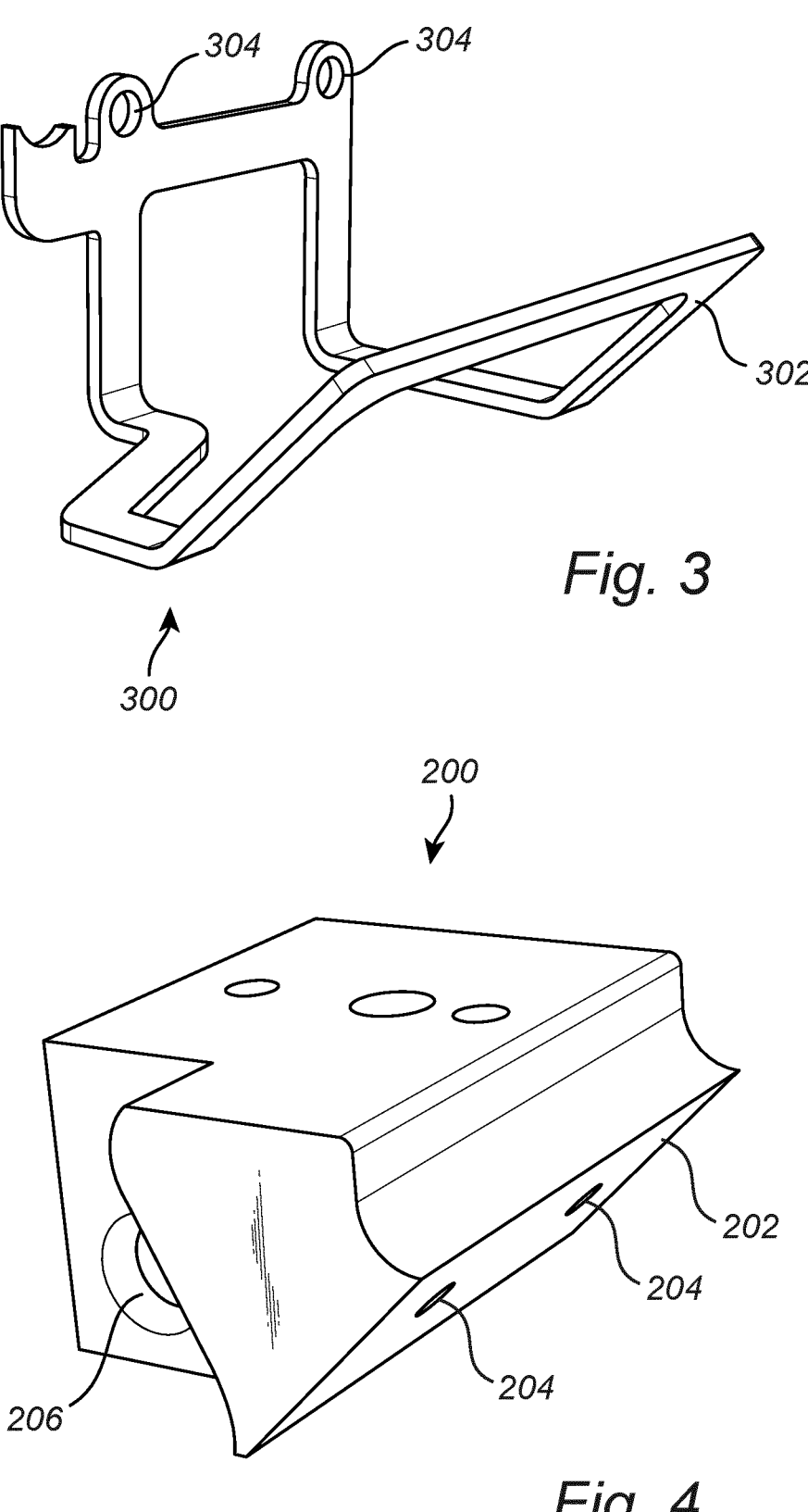
FIG. 3 discloses a perspective view of a shielding element according to one embodiment.
FIG. 4 discloses a perspective view of a base according to one embodiment.

Turning now to FIG. 3 in which a shielding element 300 is shown. The shielding element 300 may comprise mounting means 304, preferably holes 304, which allows attachment to either the base 200 or to the sealing element 100 by means of suitable fasteners such as screws. The shielding element 300 further comprises an extending portion 302 which is intended to prevent that the package 600 comes into contact with the sealing element 100 or with the base 200. The extending portion 302 extends below the sealing element 100 to a position which is near or in the plane of the side edge surface 104 of the sealing element 100 when mounted to the base 200. Preferably, the shielding element 300 is made from a material having a low thermal conductivity in order to prevent heat from the base 200 or from the sealing element 100 to spread to the extending portion 302.

FIG. 4 shows a detail view of the base 200. The base 200 may comprise a mounting surface 202, against which the sealing element 100 is attached. The mounting surface 202 is preferably arranged/inclined such that when the sealing element 100 is attached thereto, the side edge surface 104 which faces the abutment 400 is arranged essentially vertically.

What is further shown is that the base 200 may comprise a connection 206 for connecting the thermal element 500 to the base 200. Furthermore, the base 200 may comprise mounting means 204 which are used to attach the sealing element 100 to the base 200. In embodiments where the base 200 is connected to the thermal element 500, the thermal conductivity of the base 200 may correspond to that of the sealing element 100 and may be above 100 W/mK to allow heat to be transferred to the sealing element 100. In embodiments when the thermal element 500 is instead connected directly to the sealing element 100, the thermal conductivity of the base 200 is of less importance but it could be desired to have a low thermal conductivity to prevent heat transfer from the sealing element 100 to the base 200.

In a practical test, a sealing element in accordance with the embodiment of FIG. 2, made of brass and provided with a coating commercially available under the trademark Impreglon TC10S45 applied with a thickness of 40 μm (+/−10 μm), was used in a device in accordance with FIG. 1. The sealing element could be used for approximately 450 000 sealing cycles before needing to be replaced.

Figure 5:
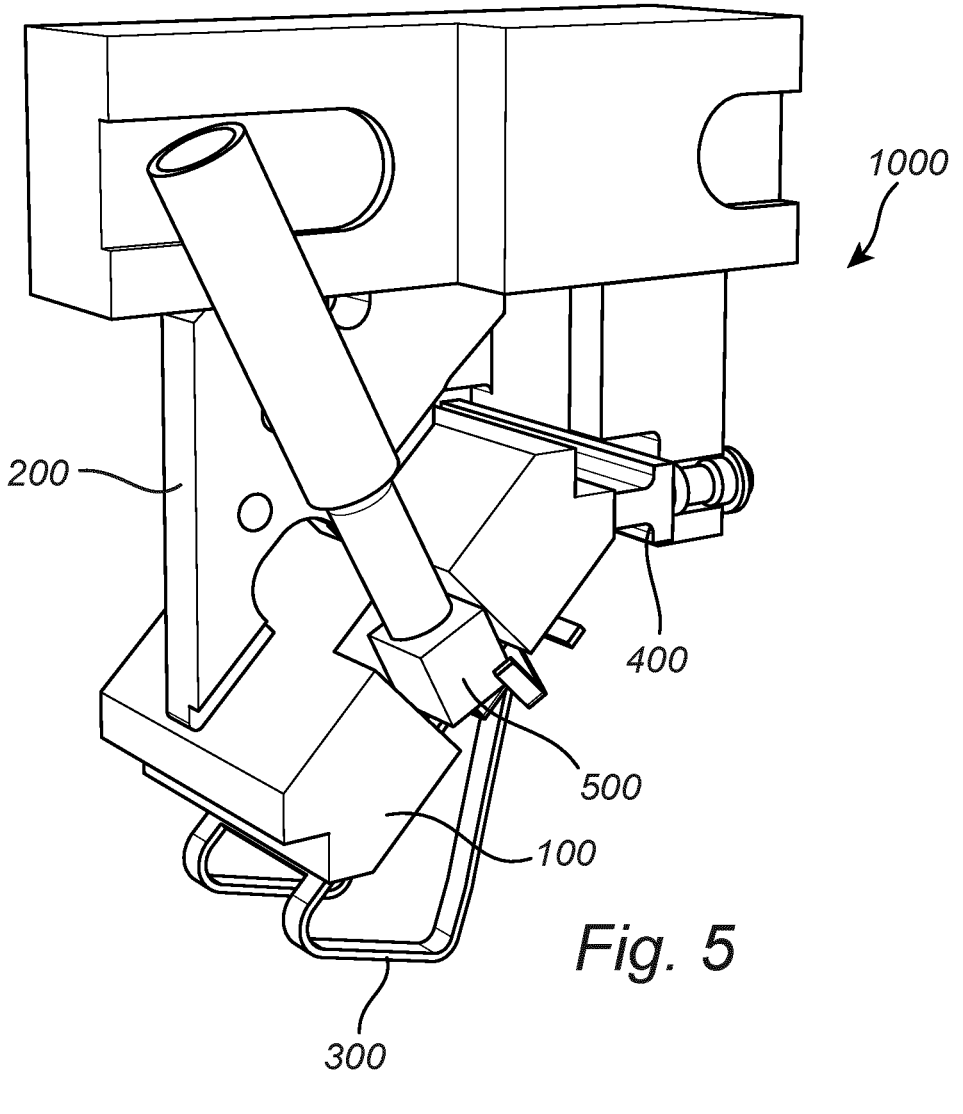
FIG. 5 discloses a perspective view of a sealing device according to one embodiment.

Turning now to FIG. 5 showing another embodiment of the sealing device 1000. As many of the features in the embodiments shown in FIGS. 5-12 are shared with the device 1000 shown in FIG. 1 and the embodiments shown in FIGS. 2-4, only the differing features will be elaborated on below and description of common features to the extent possible will be avoided.

The sealing device 1000 shown in FIG. 5 comprises a sealing element 100 releasably attachable to a base 200. In the embodiment shown in FIG. 5, the optional thermal element 500 connects to the sealing element 100. The sealing element 100 shown in FIGS. 5 and 6 could however be configured to function with the base 200 shown in FIGS. 1 and 4, with the thermal element 500 instead connected to the base 200.

Figure 7:
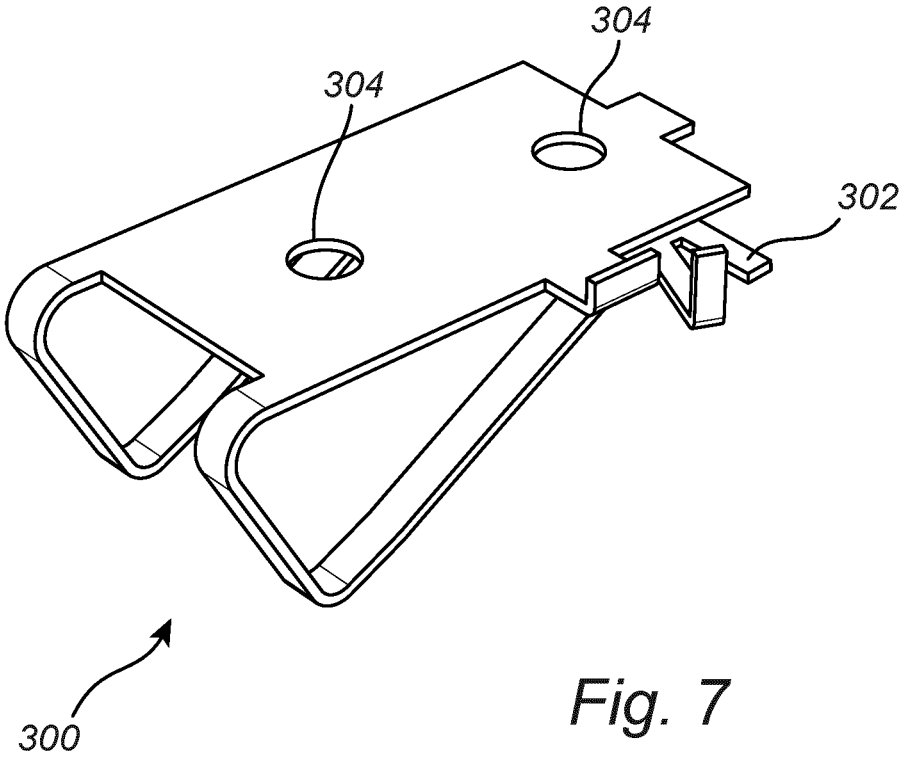
FIG. 7 discloses a perspective view of a shielding element according to one embodiment.

A protection element 300 is also optionally provided, as is shown in FIG. 5 the protection element 300 connects directly to the sealing element 100 by means of mounting means 304 shown in FIG. 7. Alternatively, the protection element 300 may be configured to connect to the base 200 as shown in FIG. 1.

Figure 6:
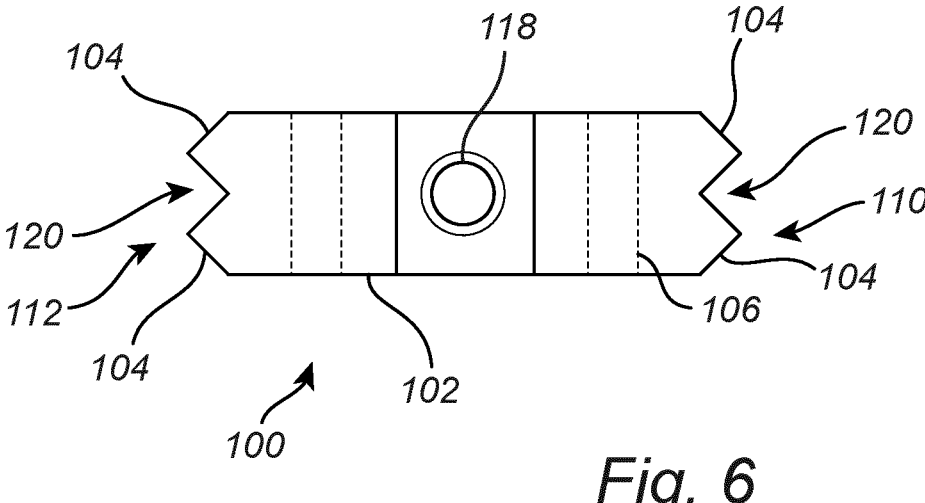
FIG. 6 discloses a side view of a sealing element according to one embodiment.

FIG. 6 shows a sealing element 100 according to one embodiment. The sealing element 100 shown in FIG. 6 comprises a groove 120 separating the top and bottom side edge surface 104 on each side edge 110, 112. The separation of the top and bottom side edge surfaces 104 reduces the risk that an eventual damage occurring to one of the side edge surfaces 104 affects the other side edge surface on each side edge 110, 112. What is further shown is that the sealing element 100 may be provided with a connection 118 for connecting the thermal element 500.

Figure 8:
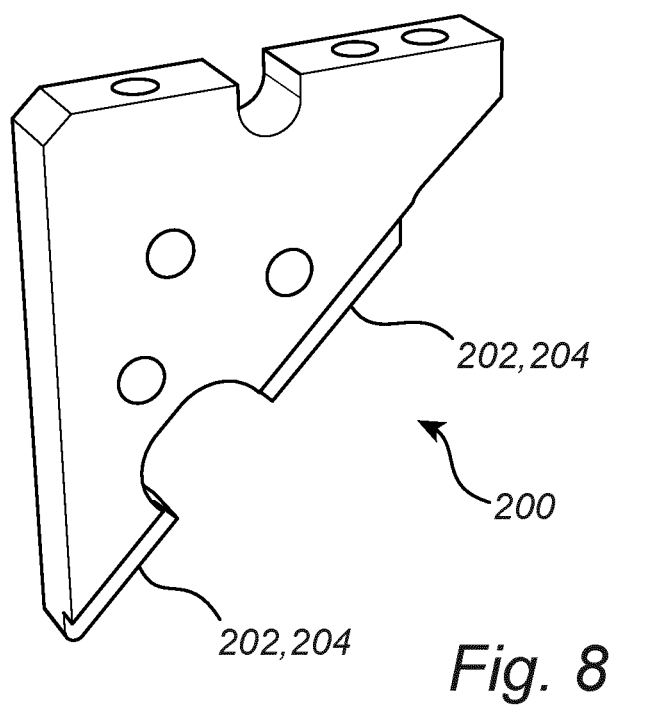
FIG. 8 discloses a perspective view of a base according to one embodiment.

FIG. 8 shows a base 200 which is configured to support the sealing element 100. As the embodiment shown in FIG. 8 is related to the embodiment of the sealing device 1000 in FIG. 5, it does not comprise a connection for the thermal element 500 as this instead may connect to the sealing element 100. It comprises a mounting surface 202, shown divided in two portions each having a mounting means 204 which allows attachment of the sealing element 100 to the base 200.

Figure 9:
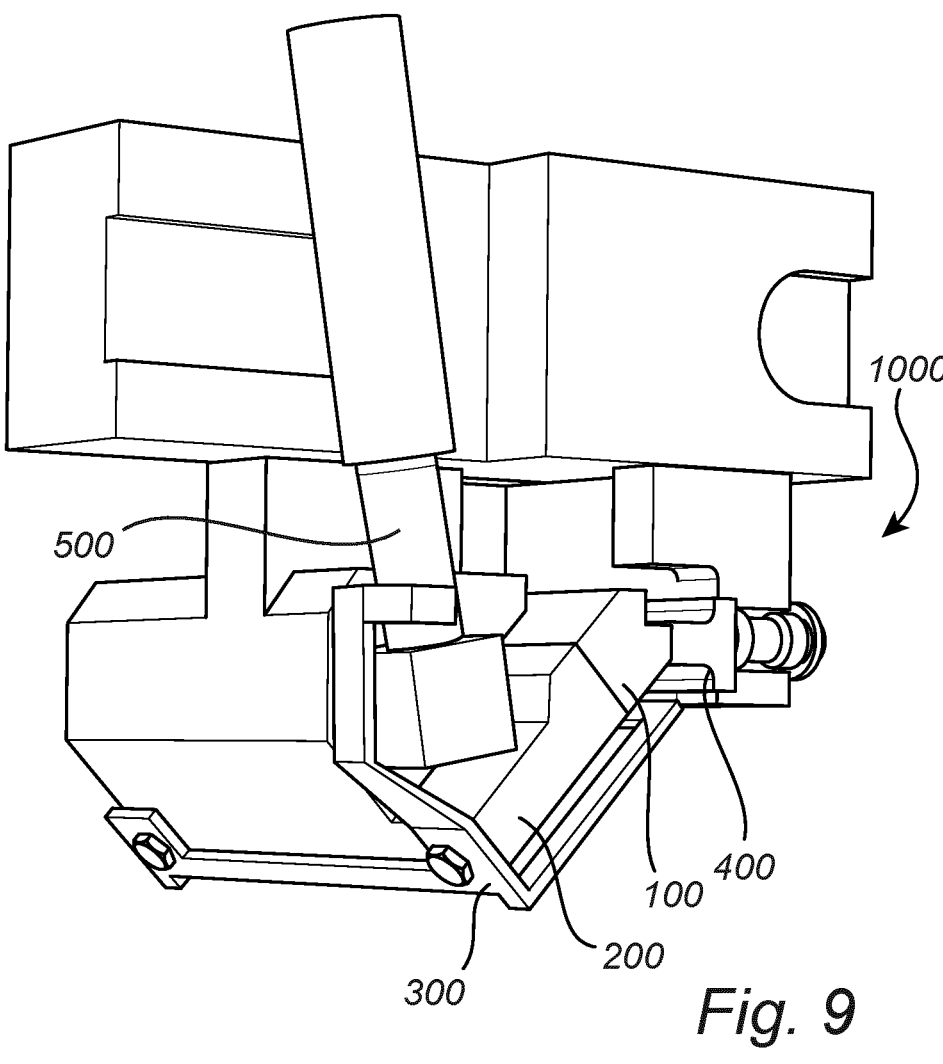
FIG. 9 discloses a perspective view of a sealing device according to one embodiment.

FIG. 9 shows another embodiment of the sealing device 1000, in which the sealing element 100 is only provided with one side edge 110. The sealing element 100 is connected to the base 200, which is connected to the thermal element 500. A shielding element 300 is provided which is connected to the base 200 as well.

Figure 10:
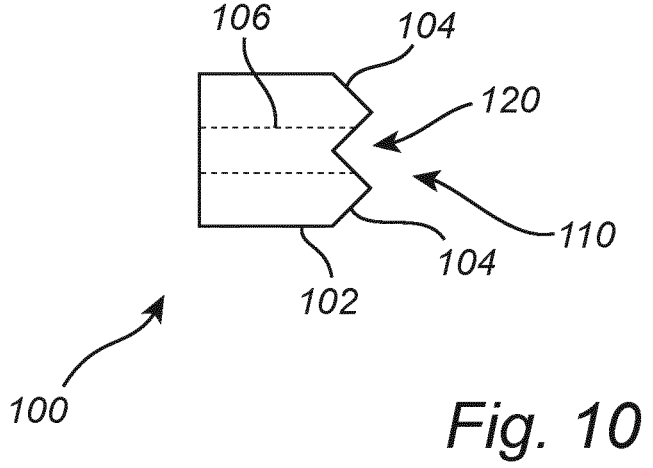
FIG. 10 discloses a side view of a sealing element according to one embodiment.

In FIG. 10, the sealing element 100 is shown in a side view. The sealing element 100 is shown comprising one side edge 110 having a top and a bottom side edge surface 104 which are separated by a groove 120. The side of the sealing element 100 opposite the side edge 110 is flat and configured to be attached to the base 200. It is to be realized that the sealing element 100 shown in FIG. 10 could just as well not be provided with a groove 120 separating the top and bottom side edge surfaces 104. The sealing element 100 comprises mounting means 106 which allows the sealing element 100 to be attached to the base 200 such that each side edge surface 104 can be arranged facing the abutment 400.

Figures 11, 12, 13, 14:
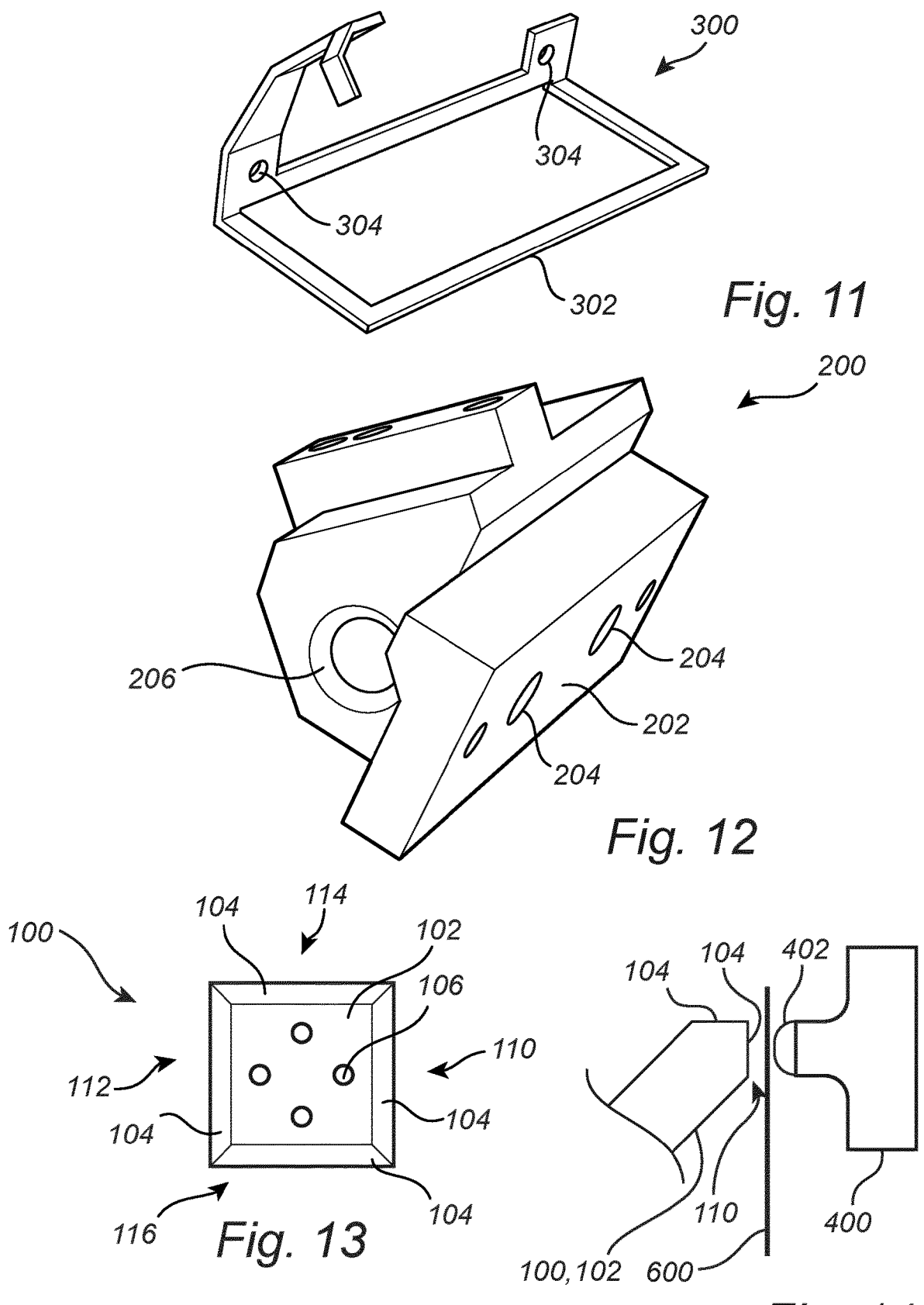
FIG. 11 discloses a perspective view of a shielding element according to one embodiment.
FIG. 12 discloses a perspective view of a base according to one embodiment.
FIG. 13 discloses a top view sealing element according to one embodiment.
FIG. 14 discloses a side view of an interface between a sealing element and an abutment according to one embodiment.

FIG. 11 shows a shielding element 300 configured to be attached to the base 200 by means of mounting means 304, the extending portion 302 reducing the risk of the package 600 coming into contact with the sealing element 100 or the base 200.

FIG. 12 shows the base 200 which comprises a mounting surface 202 intended to face the flat side of the sealing element 100 opposite the side edge 110. The mounting surface 202 is provided with mounting means 204 for attaching the sealing element 100 to the base 200. As in all embodiments herein, the mounting surface 202 is arranged such that each side edge surface 104 faces the abutment 400 and is preferably essentially vertically arranged when attached to the base 200.

FIG. 13 shows a further embodiment of the sealing element 100. The sealing element 100 shown in FIG. 13 comprises a third and fourth side edge 114, 116 opposing each other and adjoining the first side edge 112. Each of the third and fourth side edge 114, 116 are provided with a corresponding top and bottom side edge surface 104. The sealing element 100 thus comprises eight side edge surfaces 104, which all can be arranged on the base 200 such that they face the abutment 400. As each side edge surface 104 is preferably of the same size, the sealing element 100 is quadratic in shape. However, it also considered that the sealing element 100 could have other shapes such as triangular, pentagonal, hexagonal etc.

Mounting means 106 may be provided and arranged on the body 102 such that the sealing element 100 can be attached to the base 200 in an equal number of positions as there are side edge surfaces 104, whereby each of the side edge surfaces 104 can be arranged facing the abutment 400.

Turning lastly to FIG. 14, which shows a detail view of the interface between the sealing element 100 and the abutment 400 according to one embodiment. The abutment 400 may, as shown, comprise an abutment surface 402. The abutment surface 402 is preferably resilient which facilitates provision of an even pressure over the side edge surface 104. It is further shown how the package 600 is oriented between the sealing element 100 and the abutment 400 as it is about to be sealed.

It will be appreciated that the present invention is not limited to the embodiments shown. Several modifications and variations are thus conceivable within the scope of the invention which thus is exclusively defined by the appended claims.

The invention claimed is:

1. A device for sealing a package, comprising:
a sealing element comprising a body having a first side edge provided with a top and a bottom side edge surface, each of the top and bottom side edge surface being disposed at a same acute angle to an extension plane of the body in a way having the top and bottom side edge surfaces mirrored about the extension plane at the same acute angle and face away from each other,
an abutment, and
a base,
wherein the sealing element is releasably and non-rotatably supported by the base, and wherein at least one of the base and the abutment is moveably arranged for enabling engagement of the base and the abutment with the package from opposing sides for providing a seal to the package,
wherein the sealing element is attachable to the base such that the top or the bottom side edge surface of the first side edge selectively is arranged facing the abutment, wherein at least a portion of a length of each of the top or bottom side edge surface and a portion of a length of the abutment are configured to contact the package.

2. The device for sealing a package according to claim 1, wherein the abutment comprises a resilient abutment surface.

3. The device for sealing a package according to claim 1, further comprising a thermal element configured to heat at least the sealing element.

4. The device for sealing a package according to claim 3, wherein the thermal element is configured for constant heating of the sealing element.

* * * * *